(12) United States Patent
Park et al.

(10) Patent No.: US 9,018,343 B2
(45) Date of Patent: Apr. 28, 2015

(54) POLYAMIDE-IMIDE COPOLYMER FILM AND METHOD OF PREPARING POLYAMIDE-IMIDE COPOLYMER

(71) Applicant: Kolon Industries, Inc., Gwacheon-si, Gyeonggi-do (KR)

(72) Inventors: Hyo Jun Park, Yongin-si (KR); Hak Gee Jung, Yongin-si (KR)

(73) Assignee: Kolon Industries, Inc., Gyeonggi-do (KR)

( * ) Notice: Subject to any disclaimer, the term of this patent is extended or adjusted under 35 U.S.C. 154(b) by 0 days.

(21) Appl. No.: 14/347,895

(22) PCT Filed: Sep. 27, 2012

(86) PCT No.: PCT/KR2012/007784
§ 371 (c)(1),
(2) Date: Mar. 27, 2014

(87) PCT Pub. No.: WO2013/048126
PCT Pub. Date: Apr. 4, 2013

(65) Prior Publication Data
US 2014/0243482 A1 Aug. 28, 2014

(30) Foreign Application Priority Data
Sep. 30, 2011 (KR) .................. 10-2011-0100151

(51) Int. Cl.
*C08G 69/26* (2006.01)
*C08G 73/14* (2006.01)
*C08L 79/08* (2006.01)
*C08G 73/10* (2006.01)
*G02F 1/1337* (2006.01)

(52) U.S. Cl.
CPC ............. *C08G 73/14* (2013.01); *C08L 79/08* (2013.01); *C08G 73/1039* (2013.01); *C08G 73/1042* (2013.01); *C08G 73/1067* (2013.01); *G02F 1/133723* (2013.01)

(58) Field of Classification Search
USPC ................... 525/436; 528/335, 342, 350, 353
See application file for complete search history.

(56) References Cited

U.S. PATENT DOCUMENTS

| | | | |
|---|---|---|---|
| 5,003,037 A | | 3/1991 | Fenoglio et al. |
| 5,229,484 A | * | 7/1993 | Wolf et al. .................. 528/322 |
| 5,821,319 A | | 10/1998 | Shibuya et al. |
| 2009/0151987 A1 | * | 6/2009 | Yang et al. .................. 174/250 |
| 2009/0226642 A1 | * | 9/2009 | Simone et al. ............... 428/1.33 |
| 2010/0018756 A1 | * | 1/2010 | Shimeno et al. ............. 174/254 |
| 2010/0255221 A1 | * | 10/2010 | Jung et al. .................. 428/1.26 |
| 2010/0279131 A1 | * | 11/2010 | Park et al. .................. 428/473.5 |

FOREIGN PATENT DOCUMENTS

| | | |
|---|---|---|
| EP | 0 417 897 A1 | 3/1991 |
| KR | 10-2011-0035057 A | 4/2011 |

OTHER PUBLICATIONS

International Searching Authority International Search Report for PCT/KR2012/007784 dated Mar. 4, 2013.

* cited by examiner

*Primary Examiner* — Robert Jones, Jr.
(74) *Attorney, Agent, or Firm* — Sughrue Mion, PLLC

(57) ABSTRACT

Disclosed herein is a polyamide-imide copolymer film, comprising a copolymer resin in which a unit structure derived from TFDB (2,2'-bistrifluoromethyl-4,4'-biphenyl diamine), a unit structure derived from 6FDA (4,4'-(hexa-fluoroisopropylidene)diphthalic anhydride), a unit structure derived from BPDA (3,3',4,4'-biphenyltetracarboxylic dianhydride) and a unit structure derived from TPC (terephthaloyl chloride or 1,4-benzenedicarbonyl chloride) are copolymerized, wherein the copolymer resin has a weight average molecular weight of 10,000~400,000.

6 Claims, No Drawings

POLYAMIDE-IMIDE COPOLYMER FILM AND METHOD OF PREPARING POLYAMIDE-IMIDE COPOLYMER

TECHNICAL FIELD

The present invention relates to a polyamide-imide copolymer film and a method of preparing a polyamide-imide copolymer.

BACKGROUND ART

A polyimide film has excellent thermal and mechanical properties. Recently, as the demand for high-temperature materials has increased, the necessity of use thereof has been on the rise. However, a polyimide film has been used restrictively because it is expensive.

Particularly, in the fields of displays, a polyimide film having excellent thermal and mechanical properties as well as excellent optical properties has attractive considerable attention lately.

Thus, as the requirement for an inexpensive polyimide film having excellent thermal, mechanical and optical properties increases, attempts to mix a polyamide with a polyimide (a main material of a polyimide film) or to copolymerize them are being made.

However, a polyamide-imide copolymer film satisfying optical properties as well as thermal and mechanical properties required in the market is not actually provided yet.

DISCLOSURE

Technical Problem

Accordingly, the present invention has been made to solve the above-mentioned problems, and an object of the present invention is to provide a polyamide-imide copolymer film having excellent thermal, mechanical and optical properties and a method of preparing a polyamide-imide copolymer.

Technical Solution

In order to accomplish the above object, an aspect of the present invention provides a polyamide-imide copolymer film, including a copolymer resin in which a unit structure derived from TFDB (2,2'-bistrifluoromethyl-4,4'-biphenyl diamine), a unit structure derived from 6FDA (4,4'-(hexafluoroisopropylidene)diphthalic anhydride), a unit structure derived from BPDA (3,3',4,4'-biphenyltetracarboxylic dianhydride) and a unit structure derived from TPC (terephthaloyl chloride or 1,4-benzenedicarbonyl chloride) are copolymerized.

Another aspect of the present invention provides a method of preparing a polyamide-imide copolymer, comprising the steps of: primarily polymerizing TFDB, 6FDA and BPDA by a solution reaction to obtain a first polymer, and then secondarily polymerizing the first polymer with TPC by a solution reaction to prepare a polyamic acid solution; and imidizing the polyamic acid solution in the presence of an imidization catalyst.

Advantageous Effects

The present invention provides a polyamide-imide copolymer film having excellent thermal, mechanical and optical properties and a method of preparing a polyamide-imide copolymer.

BEST MODE

The present invention provides a polyamide-imide copolymer film, including a copolymer resin in which a unit structure derived from TFDB (2,2'-bistrifluoromethyl-4,4'-biphenyl diamine), a unit structure derived from 6FDA (4,4'-(hexafluoroisopropylidene)diphthalic anhydride), a unit structure derived from BPDA (3,3',4,4'-biphenyltetracarboxylic dianhydride) and a unit structure derived from TPC (terephthaloyl chloride or 1,4-benzenedicarbonyl chloride) are copolymerized. Here, the copolymer resin may have a weight average molecular weight of 10,000~400,000.

That is, the polyamide-imide copolymer film includes: a copolymer of a unit structure derived from TFDB and a unit structure derived from TPC as a polyamide component; and a copolymer of a unit structure derived from TFDB, a unit structure derived from 6FDA and a unit structure derived from BPDA as a polyimide component. Here, both the polyamide component and the polyimide component commonly include the diamine-based unit structure derived from TFDB, and the polyimide component includes a copolymer of 6FDA and BPDA, so the polyimide component has a high glass transition temperature, excellent optical properties, high solubility, a high thermal expansion coefficient (CTE) and high surface hardness, and the polyamide component has a low thermal expansion coefficient (CTE) and excellent mechanical properties, thereby forming a transparent polyamide-imide copolymer film having high heat resistance, thermal expansion coefficient and surface hardness.

Further, since the polyamide component and the polyimide component are copolymerized with each other, the excellent thermal and mechanical properties of the polyimide component are integrated with the optical properties of the polyamide component without being separated therefrom, thereby realizing the characteristics of a single copolymer.

Here, in the copolymer resin, the unit structures are copolymerized such that the molar ratio of the unit structure derived from TFDB: the sum of the unit structure derived from 6FDA and the unit structure derived from BPDA: the unit structure derived from TPC is 1:0.2~0.8:0.8~0.2. In this case, the characteristics of the polyamide component and the polyimide component can be meaningfully exhibited, respectively, and the optical characteristics of the polyamide component and the thermal and mechanical characteristics of the polyimide component can be optimized.

When the molar ratio of the unit structure derived from TPC to other unit structures is more than 0.2, the optical properties of the polyamide component can be sufficiently exhibited. When the molar ratio thereof is less than 0.8, it is easy to control the degree of polymerization during copolymerization, thereby preparing a copolymer that can exhibit uniform physical properties.

Further, in the sum of the unit structure derived from 6FDA and the unit structure derived from BPDA, the molar ratio of the unit structure derived from 6FDA: the unit structure derived from BPDA may be 1:0.2~4. When the molar ratio of the unit structure derived from 6FDA to the unit structure derived from BPDA is 0.2 or more, the thermal expansion coefficient and surface hardness of the polyamide-imide copolymer film can be sufficiently improved, and when the molar ratio thereof 4 or less, the average transmissivity and yellowness of the polyamide-imide copolymer film can be maintained excellent.

Further, the copolymer resin, in which the unit structure derived from TFDB, the unit structure derived from 6FDA, the unit structure derived from BPDA and the unit structure derived from TPC are copolymerized, has a weight average molecular weight of 10,000~400,000. When the weight average molecular weight of the copolymer resin is less than 10,000, there is a problem in that the thermal and optical properties of the polyamide-imide copolymer film as well as the mechanical properties thereof deteriorate. Further, when the weight average molecular weight thereof is more than 400,000, it is difficult to treat the polyamide-imide copolymer film because its viscosity is high.

In addition, the present invention provides a method of preparing a polyamide-imide copolymer, including the steps of: primarily polymerizing TFDB, 6FDA and BPDA by a solution reaction to obtain a first polymer, and then secondarily polymerizing the first polymer with TPC by a solution reaction to prepare a polyamic acid solution; and imidizing the polyamic acid solution in the presence of an imidization catalyst.

In the method of preparing a polyamide-imide copolymer according to the present invention, TFDB, 6FDA and BPDA are primarily polymerized by a solution reaction to obtain a first polymer, and then the first polymer is secondarily polymerized with TPC by a solution reaction to prepare a polyamic acid solution. That is, the polyamic acid component is first polymerized, and then the polyamide component is copolymerized.

When the polyamide component is first polymerized, the viscosity thereof rapidly increases, and thus the reaction of the polyamide component to the polyamic acid component does not take place uniformly. Further, when the polyamide component is first polymerized, since the solubility of the polyamide component is low compared to that of the polyamic acid component, a white turbidity phenomenon may occur, so that phase separation may occur. Therefore, it is advantageous that the polyamic acid component is first polymerized.

If polyamic acid and polyamide are each independently polymerized and then bonded with each other using a binder, they are not partially bonded as a copolymer thereof, thus deteriorating the physical properties thereof.

In the process of preparing polyamic acid, in the step of primarily polymerizing TFDB, 6FDA and BPDA, 100 mol % of TFDB may solution-react with X mol % of 6FDA and Y mol % of BPDA to obtain the first polymer, and, in the step of secondarily polymerizing the first polymer with TPC, the first polymer may solution-react with 100−(X+Y) mol % of TPC (X+Y is 20~80).

Here, in the imidization process, as the imidization catalyst, a generally-used imidization catalyst may be used. Pyridine and acetic anhydride may be simultaneously used.

The polyamide-imide copolymer film of the present invention may be manufactured using the polyamide-imide copolymer obtained by this method.

MODE FOR INVENTION

Hereinafter, the present invention will be described in more detail with reference to the following Examples. These Examples are set forth to illustrate the present invention, and the scope of the present invention is not limited thereto.

Example 1

Preparation of a Polyamide-Imide Copolymer

A 1.5 L reactor provided with a stirrer, a nitrogen injector, a dropping funnel, a temperature controller and a cooler was filled with 769 g of N,N-dimethylacetamide (DMAc) while injecting nitrogen into the reactor, and was then heated to a temperature of 25° C. Then, 64.046 g (0.2 mol) of TFDB was dissolved in the N,N-dimethylacetamide (DMAc) in the reactor to obtain a first solution, and this first solution was maintained at 25° C. Subsequently, 8.885 g (0.02 mol) of 6FDA and 17.653 g (0.06 mol) of BPDA were added to the first solution and then stirred for a predetermined amount of time to dissolve and react them to obtain a second solution. The second solution was maintained at 25° C. Subsequently, 24.362 g (0.12 mol) of TPC was added to the second solution to obtain a polyamic acid solution having a solid content of 13 wt %. Subsequently, 13 g of pyridine and 17 g of acetic anhydride were added to the polyamic acid solution, stirred at 25° C. for 30 minutes, stirred at 70° C. for 1 hour, cooled to room temperature, and then precipitated with 20 L of methanol. Subsequently, the precipitated solid was filtered, pulverized, and then dried in vacuum at 100° C. for 6 hours to obtain 108 g of a polyamide-imide copolymer powder.

Manufacture of a Polyamide-Imide Copolymer Film 108 g of the polyamide-imide copolymer powder was dissolved in 722 g of N,N-dimethylacetamide (DMAc) to obtain a solution having a concentration of 13 wt %. The obtained solution was applied onto a stainless steel substrate, cast to a thickness of 390 μm, and then dried at 130° C. for 30 minutes using hot air to form a film. The film was separated from the stainless steel substrate, and was fixed on a frame with pins. The frame fixed with the film was put into a vacuum oven, slowly heated from 100° C. to 300° C. and then slowly cooled. Then, the film was separated from the frame to obtain a polyamide-imide copolymer film. Thereafter, finally, the polyamide-imide copolymer film was heat-treated at 300° C. for 30 minutes (thickness: 50 μm).

Example 2

Preparation of a Polyamide-Imide Copolymer

As in Example 1, a 1.5 L reactor was filled with 789 g of N,N-dimethylacetamide (DMAc), and was then heated to a temperature of 25° C. Then, 64.046 g (0.2 mol) of TFDB was dissolved in the N,N-dimethylacetamide (DMAc) in the reactor to obtain a first solution, and this first solution was maintained at 25° C. Subsequently, 17.77 g (0.04 mol) of 6FDA and 11.769 g (0.04 mol) of BPDA were added to the first solution and then stirred for a predetermined amount of time to dissolve and react them to obtain a second solution. The second solution was maintained at 25° C. Subsequently, 24.362 g (0.12 mol) of TPC was added to the second solution to obtain a polyamic acid solution having a solid content of 13 wt %.

Subsequently, 13 g of pyridine and 17 g of acetic anhydride were added to the polyamic acid solution, stirred at 25° C. for 30 minutes, stirred at 70° C. for 1 hour, cooled to room temperature, and then precipitated with 20 L of methanol. The precipitated solid was then filtered, pulverized, and dried in vacuum at 100° C. for 6 hours to obtain 111 g of a polyamide-imide copolymer powder.

Manufacture of a Polyamide-Imide Copolymer Film 111 g of the polyamide-imide copolymer powder was dissolved in 742 g of N,N-dimethylacetamide (DMAc) to obtain a solution having a concentration of 13 wt %.

Thereafter, the obtained solution was processed in the same manner as in Example 1 to manufacture a polyamide-imide copolymer film.

Example 3

Preparation of a Polyamide-Imide Copolymer

As in Example 1, a 1.5 L reactor was filled with 809 g of N,N-dimethylacetamide (DMAc), and was then heated to a temperature of 25° C. Then, 64.046 g (0.2 mol) of TFDB was dissolved in the N,N-dimethylacetamide (DMAc) in the reactor to obtain a first solution, and this first solution was maintained at 25° C. Subsequently, 26.655 g (0.06 mol) of 6FDA and 5.584 g (0.02 mol) of BPDA were added to the first solution and then stirred for a predetermined amount of time to dissolve and react them to obtain a second solution. The second solution was maintained at 25° C. Subsequently, 24.362 g (0.12 mol) of TPC was added to the second solution to obtain a polyamic acid solution having a solid content of 13 wt %.

Subsequently, 13 g of pyridine and 17 g of acetic anhydride were added to the polyamic acid solution, stirred at 25° C. for 30 minutes, stirred at 70° C. for 1 hour, cooled to room temperature, and then precipitated with 20 L of methanol. The precipitated solid was then filtered, pulverized, and dried in vacuum at 100° C. for 6 hours to obtain 114 g of a polyamide-imide copolymer powder.

Manufacture of a Polyamide-Imide Copolymer Film 114 g of the polyamide-imide copolymer powder was dissolved in 763 g of N,N-dimethylacetamide (DMAc) to obtain a solution having a concentration of 13 wt %.

Thereafter, the obtained solution was processed in the same manner as in Example 1 to manufacture a polyamide-imide copolymer film.

Example 4

Preparation of a Polyamide-Imide Copolymer

As in Example 1, a 1.5 L reactor was filled with 781 g of N,N-dimethylacetamide (DMAc), and was then heated to a temperature of 25° C. Then, 64.046 g (0.2 mol) of TFDB was dissolved in the N,N-dimethylacetamide (DMAc) in the reactor to obtain a first solution, and this first solution was maintained at 25° C. Subsequently, 8.885 g (0.02 mol) of 6FDA and 23.538 g (0.08 mol) of BPDA were added to the first solution and stirred for a predetermined amount of time to dissolve and react them to obtain a second solution. The second solution was maintained at 25° C. Subsequently, 20.302 g (0.10 mol) of TPC was added to the second solution to obtain a polyamic acid solution having a solid content of 13 wt %.

Subsequently, 16 g of pyridine and 21 g of acetic anhydride were added to the polyamic acid solution, stirred at 25° C. for 30 minutes, stirred at 70° C. for 1 hour, cooled to room temperature, and then precipitated with 20 L of methanol. The precipitated solid was then filtered, pulverized, and dried in vacuum at 100° C. for 6 hours to obtain 110 g of a polyamide-imide copolymer powder.

Manufacture of a Polyamide-Imide Copolymer Film 110 g of the polyamide-imide copolymer powder was dissolved in 736 g of N,N-dimethylacetamide (DMAc) to obtain a solution having a concentration of 13 wt %.

Thereafter, the obtained solution was processed in the same manner as in Example 1 to manufacture a polyamide-imide copolymer film.

Example 5

Preparation of a Polyamide-Imide Copolymer

As in Example 1, a 1.5 L reactor was filled with 801 g of N,N-dimethylacetamide (DMAc), and was then heated to a temperature of 25° C. Then, 64.046 g (0.2 mol) of TFDB was dissolved in the N,N-dimethylacetamide (DMAc) in the reactor to obtain a first solution, and this first solution was maintained at 25° C. Subsequently, 17.77 g (0.04 mol) of 6FDA and 17.653 g (0.06 mol) of BPDA were added to the first solution and then stirred for a predetermined amount of time to dissolve and react them to obtain a second solution. The second solution was maintained at 25° C. Subsequently, 20.302 g (0.10 mol) of TPC was added to the second solution to obtain a polyamic acid solution having a solid content of 13 wt %.

Subsequently, 16 g of pyridine and 21 g of acetic anhydride were added to the polyamic acid solution, stirred at 25° C. for 30 minutes, stirred at 70° C. for 1 hour, cooled to room temperature, and then precipitated with 20 L of methanol. The precipitated solid was then filtered, pulverized, and dried in vacuum at 100° C. for 6 hours to obtain 110 g of a polyamide-imide copolymer powder.

Manufacture of a Polyamide-Imide Copolymer Film 110 g of the polyamide-imide copolymer powder was dissolved in 736 g of N,N-dimethylacetamide (DMAc) to obtain a solution having a concentration of 13 wt %.

Thereafter, the obtained solution was processed in the same manner as in Example 1 to manufacture a polyamide-imide copolymer film.

Example 6

Preparation of a Polyamide-Imide Copolymer

As in Example 1, a 1.5 L reactor was filled with 821 g of N,N-dimethylacetamide (DMAc), and was then heated to a temperature of 25° C. Then, 64.046 g (0.2 mol) of TFDB was dissolved in the N,N-dimethylacetamide (DMAc) in the reactor to obtain a first solution, and this first solution was maintained at 25° C. Subsequently, 17.77 g (0.06 mol) of 6FDA and 17.653 g (0.04 mol) of BPDA were added to the first solution and then stirred for a predetermined amount of time to dissolve and react them to obtain a second solution. The second solution was maintained at 25° C. Subsequently, 20.302 g (0.10 mol) of TPC was added to the second solution to obtain a polyamic acid solution having a solid content of 13 wt %.

Subsequently, 16 g of pyridine and 21 g of acetic anhydride were added to the polyamic acid solution, stirred at 25° C. for 30 minutes, stirred at 70° C. for 1 hour, cooled to room temperature, and then precipitated with 20 L of methanol. The precipitated solid was then filtered, pulverized, and dried in vacuum at 100° C. for 6 hours to obtain 116 g of a polyamide-imide copolymer powder.

Manufacture of a Polyamide-Imide Copolymer Film 116 g of the polyamide-imide copolymer powder was dissolved in 776 g of N,N-dimethylacetamide (DMAc) to obtain a solution having a concentration of 13 wt %.

Thereafter, the obtained solution was processed in the same manner as in Example 1 to manufacture a polyamide-imide copolymer film.

Example 7

Preparation of a Polyamide-Imide Copolymer

As in Example 1, a 1.5 L reactor was filled with 841 g of N,N-dimethylacetamide (DMAc), and was then heated to a temperature of 25° C. Then, 64.046 g (0.2 mol) of TFDB was dissolved in the N,N-dimethylacetamide (DMAc) in the reactor to obtain a first solution, and this first solution was maintained at 25° C. Subsequently, 35.54 g (0.08 mol) of 6FDA and 5.884 g (0.02 mol) of BPDA were added to the first solution and then stirred for a predetermined amount of time to dissolve and react them to obtain a second solution. The second solution was maintained at 25° C. Subsequently, 20.302 g (0.10 mol) of TPC was added to the second solution to obtain a polyamic acid solution having a solid content of 13 wt %.

Subsequently, 16 g of pyridine and 21 g of acetic anhydride were added to the polyamic acid solution, stirred at 25° C. for 30 minutes, stirred at 70° C. for 1 hour, cooled to room temperature, and then precipitated with 20 L of methanol. The precipitated solid was then filtered, pulverized, and dried in vacuum at 100° C. for 6 hours to obtain 118 g of a polyamide-imide copolymer powder.

Manufacture of a Polyamide-Imide Copolymer Film 118 g of the polyamide-imide copolymer powder was dissolved in 790 g of N,N-dimethylacetamide (DMAc) to obtain a solution having a concentration of 13 wt %.

Thereafter, the obtained solution was processed in the same manner as in Example 1 to manufacture a polyamide-imide copolymer film.

Comparative Example 1

Preparation of Polyimide

A reactor was filled with 611 g of N,N-dimethylacetamide (DMAc), and was then heated to a temperature of 25° C. Then, 64.046 g (0.2 mol) of TFDB was dissolved in the N,N-dimethylacetamide (DMAc) in the reactor to obtain a first solution, and this first solution was maintained at 25° C. Subsequently, 88.85 g (0.2 mol) of 6FDA was added to the first solution to obtain a polyamic acid solution having a solid content of 20 wt %.

Subsequently, the polyamic acid solution was stirred at room temperature for 8 hours. Then, 31.64 g of pyridine and 40.91 g of acetic anhydride were added to the stirred polyamic acid solution, stirred at 25° C. for 30 minutes, stirred at 80° C. for 2 hours, cooled to room temperature, and then slowly introduced into a vessel filled with 20 L of methanol to precipitate the polyamic acid solution. Subsequently, the precipitated solid was filtered, pulverized, and dried in vacuum at 100° C. for 6 hours to obtain 136 g of a polyimide powder.

Manufacture of a Polyimide Film 136 g of the polyimide powder was dissolved in 790 g of N,N-dimethylacetamide (DMAc) to obtain a solution having a concentration of 20 wt %. Thereafter, the obtained solution was processed in the same manner as in Example 1 to manufacture a polyimide film.

Comparative Example 2

Preparation of Polyamide

As in Example 1, a 2 L reactor was filled with 1203 g of N,N-dimethylacetamide (DMAc), and was then heated to a temperature of 25° C. Then, 64.046 g (0.2 mol) of TFDB was dissolved in the N,N-dimethylacetamide (DMAc) in the reactor to obtain a first solution, and this first solution was maintained at 25° C. Subsequently, 40.6 g (0.2 mol) of TPC were added to the first solution and then stirred for 1 hour to dissolve and react them to obtain a second solution. The second solution was maintained at 25° C. to obtain a polyamic acid solution having a solid content of 8 wt %. Subsequently, the polyamic acid solution was slowly introduced into a vessel filled with 20 L of distilled water to precipitate the polyamic acid solution. Then, the precipitated solid was filtered, pulverized, and dried in vacuum at 100° C. for 6 hours to obtain 101 g of a polyamide powder.

Manufacture of a Polyamide Film 101 g of the polyamide powder was dissolved in 1161 g of N,N-dimethylacetamide (DMAc) to obtain a solution having a concentration of 8 wt %. Thereafter, the obtained solution was processed in the same manner as in Example 1 to manufacture a polyamide film.

Comparative Example 3

Preparation of a Polyamide-Imide Copolymer

As in Example 1, a 1.5 L reactor was filled with 829 g of N,N-dimethylacetamide (DMAc), and was then heated to a temperature of 25° C. Then, 64.046 g (0.2 mol) of TFDB was dissolved in the N,N-dimethylacetamide (DMAc) in the reactor to obtain a first solution, and this first solution was maintained at 25° C. Subsequently, 35.54 g (0.08 mol) of 6FDA was added to the first solution and then stirred for 1 hour to dissolve and react them to obtain a second solution. The second solution was maintained at 25° C. Subsequently, 24.362 g (0.12 mol) of TPC was added to the second solution to obtain a polyamic acid solution having a solid content of 13 wt %.

Subsequently, the polyamic acid solution was stirred at room temperature for 8 hours. Then, 13 g of pyridine and 17 g of acetic anhydride were added to the stirred polyamic acid solution, stirred at room temperature for 30 minutes, stirred at 70° C. for 1 hour, cooled to room temperature, and then precipitated with 20 L of methanol. The precipitated solid was then filtered, pulverized, and dried in vacuum at 100° C. for 6 hours to obtain 118 g of a polyamide-imide copolymer powder.

Manufacture of a Polyamide-Imide Copolymer Film 118 g of the polyamide-imide copolymer powder was dissolved in 788 g of N,N-dimethylacetamide (DMAc) to obtain a solution having a concentration of 13 wt %.

Thereafter, the obtained solution was processed in the same manner as in Example 1 to manufacture a polyamide-imide copolymer film.

Comparative Example 4

Preparation of a Polyamide-Imide Copolymer

As in Example 1, a 1.5 L reactor was filled with 861 g of N,N-dimethylacetamide (DMAc), and was then heated to a temperature of 25° C. Then, 64.046 g (0.2 mol) of TFDB was dissolved in the N,N-dimethylacetamide (DMAc) in the reactor to obtain a first solution, and this first solution was maintained at 25° C. Subsequently, 44.425 g (0.1 mol) of 6FDA was added to the first solution and then stirred for 1 hour to dissolve and react them to obtain a second solution. The second solution was maintained at 25° C. Subsequently, 20.302 g (0.1 mol) of TPC was added to the second solution to obtain a polyamic acid solution having a solid content of 13 wt %.

Subsequently, the polyamic acid solution was stirred at room temperature for 8 hours. Then, 13 g of pyridine and 17 g of acetic anhydride were added to the stirred polyamic acid solution, stirred at room temperature for 30 minutes, stirred at 70° C. for 1 hour, cooled to room temperature, and precipitated with 20 L of methanol. The precipitated solid was then filtered, pulverized, and dried in vacuum at 100° C. for 6 hours to obtain 122 g of a polyamide-imide copolymer powder.

Manufacture of a Polyamide-Imide Copolymer Film 122 g of the polyamide-imide copolymer powder was dissolved in 816 g of N,N-dimethylacetamide (DMAc) to obtain a solution having a concentration of 13 wt %.

Thereafter, the obtained solution was processed in the same manner as in Example 1 to manufacture a polyamide-imide copolymer film.

<Method of Evaluating Physical Properties>

(1) Average Transmissivity

The average transmissivity of each of the films manufactured in the Examples and Comparative Examples at 380~780 nm was measured using a UV spectrometer (CM-3700d, manufactured by Konica Minolta Inc.).

(2) Yellow Index (Y.I.)

The yellow index of each of the films manufactured in the Examples and Comparative Examples at 380~780 nm was measured using a UV spectrometer (CM-3700d, manufactured by Konica Minolta Inc.) based on the ASTM E313 standards.

(3) Thermal Expansion Coefficient (CTE)

The thermal expansion coefficient of each of the films manufactured in the Examples and Comparative Examples at 50~260° C. was measured twice using a thermo-mechanical analyzer (Diamond TMA, manufactured by Perkin Elmer Corp.) under the conditions of a heating rate of 10° C./min and a load of 100 mN. Among these two measured values, the second measured value was selected, excluding the first measured value. The reason for this is that residual stress may exist in the film by the heat treatment after the formation of the film. Therefore, after residual stress was completely removed from the film, the thermal expansion coefficient thereof was secondarily measured, and the measure value thereof was selected.

(4) Thickness

The thickness of each of the films manufactured in Examples and Comparative Examples was measured using an Anritsu Electronic Micrometer (error: ±0.5% or less)

(5) Hardness

The hardness of each of the films manufactured in the Examples and Comparative Examples was measured using a pencil hardness tester with a pencil load of 500 g and a pencil speed of 15 mm/min based on the ASTM D3363.

The invention claimed is:

1. A polyamide-imide copolymer film, comprising a copolymer resin in which a unit structure derived from TFDB (2,2'-bistrifluoromethyl-4,4'-biphenyl diamine), a unit structure derived from 6FDA (4,4'-(hexa-fluoroisopropylidene) diphthalic anhydride), a unit structure derived from BPDA (3,3',4,4'-biphenyltetracarboxylic dianhydride) and a unit structure derived from TPC (terephthaloyl chloride or 1,4-benzenedicarbonyl chloride) are copolymerized.

2. The polyamide-imide copolymer film of claim 1, wherein, in the copolymer resin, the unit structures are copolymerized such that the molar ratio of the unit structure derived from TFDB: the sum of the unit structure derived from 6FDA and the unit structure derived from BPDA: the unit structure derived from TPC is 1:0.2~0.8:0.8~0.2.

3. The polyamide-imide copolymer film of claim 2, wherein, in the sum of the unit structure derived from 6FDA and the unit structure derived from BPDA, the molar ratio of the unit structure derived from 6FDA: the unit structure derived from BPDA is 1:0.2~4.

4. The polyamide-imide copolymer film of claim 1, wherein the copolymer resin has a weight average molecular weight of 10,000~400,000.

5. A method of preparing a polyamide-imide copolymer, comprising the steps of:
primarily polymerizing TFDB, 6FDA and BPDA by a solution reaction to obtain a first polymer, and then secondarily polymerizing the first polymer with TPC by a solution reaction to prepare a polyamic acid solution; and
imidizing the polyamic acid solution in the presence of an imidization catalyst.

6. The method of claim 5, wherein, in the step of primarily polymerizing TFDB, 6FDA and BPDA, 100 mol % of TFDB solution-reacts with X mol % of 6FDA and Y mol % of BPDA to obtain the first polymer, and, in the step of secondarily polymerizing the first polymer with TPC, the first polymer solution-reacts with 100−(X+Y) mol % of TPC (X+Y is 20~80).

TABLE 1

| | TFDB | 6FDA | BPDA | TPC | Thickness (μm) | Average transmissivity (%) | Y.I. | CTE (ppm/° C.) | Hardness |
|---|---|---|---|---|---|---|---|---|---|
| Comp. Exp. 1 | 0.2 | 0.2 | — | — | 50 | 90.8 | 2.2 | 65 | H |
| Exp. 1 | 0.2 | 0.02 | 0.06 | 0.12 | 50 | 88.0 | 4.0 | 10 | 4H |
| Exp. 2 | 0.2 | 0.04 | 0.04 | 0.12 | 50 | 89.0 | 3.5 | 15 | 3H |
| Exp. 3 | 0.2 | 0.06 | 0.02 | 0.12 | 50 | 89.0 | 3.3 | 17 | 3H |
| Exp. 4 | 0.2 | 0.02 | 0.08 | 0.10 | 50 | 85.5 | 5.6 | 8 | 4H |
| Exp. 5 | 0.2 | 0.04 | 0.06 | 0.10 | 50 | 87.0 | 4.5 | 11 | 4H |
| Exp. 6 | 0.2 | 0.06 | 0.04 | 0.10 | 50 | 88.2 | 4.1 | 17 | 3H |
| Exp. 7 | 0.2 | 0.08 | 0.02 | 0.10 | 50 | 89.0 | 3.5 | 22 | 3H |
| Comp. Exp. 2 | 0.2 | — | — | 0.2 | 35 | 84 | 10 | 12 | 2H |
| Comp Exp. 3 | 0.2 | 0.08 | — | 0.12 | 50 | 89.6 | 3.0 | 37 | 2H |
| Comp Exp. 4 | 0.2 | 0.1 | — | 0.1 | 50 | 89.8 | 2.8 | 42 | 2H |

Although the preferred embodiments of the present invention have been disclosed for illustrative purposes, those skilled in the art will appreciate that various modifications, additions, and substitutions are possible, without departing from the scope and spirit of the invention as disclosed in the accompanying claims.

* * * * *